(12) United States Patent
Larson

(10) Patent No.: US 9,333,511 B2
(45) Date of Patent: May 10, 2016

(54) APPARATUS AND METHOD FOR DRILLING FLUID DENSITY SEPARATOR USING MAGNETS

(71) Applicant: NATIONAL OILWELL VARCO, L.P., Houston, TX (US)

(72) Inventor: Thomas R. Larson, Montgomery, TX (US)

(73) Assignee: National Oilwell Varco, L.P., Houston, TX (US)

( * ) Notice: Subject to any disclaimer, the term of this patent is extended or adjusted under 35 U.S.C. 154(b) by 9 days.

(21) Appl. No.: 14/315,233

(22) Filed: Jun. 25, 2014

(65) Prior Publication Data

US 2014/0305875 A1    Oct. 16, 2014

Related U.S. Application Data

(63) Continuation of application No. 12/841,760, filed on Jul. 22, 2010, now Pat. No. 8,795,535.

(60) Provisional application No. 61/227,961, filed on Jul. 23, 2009.

(51) Int. Cl.
| | |
|---|---|
| *B03C 1/02* | (2006.01) |
| *B03C 1/30* | (2006.01) |
| *B03C 1/32* | (2006.01) |
| *B03C 5/02* | (2006.01) |

(Continued)

(52) U.S. Cl.
CPC . *B03C 1/32* (2013.01); *B01D 21/26* (2013.01); *B03C 1/02* (2013.01); *B03C 1/30* (2013.01); *B03C 5/02* (2013.01); *E21B 21/065* (2013.01); *B03C 2201/18* (2013.01)

(58) Field of Classification Search
CPC .............. B03C 1/02; B03C 1/30; B03C 1/32; B03C 2201/18; B01D 21/26; E21B 21/065
See application file for complete search history.

(56) References Cited

U.S. PATENT DOCUMENTS

| | | |
|---|---|---|
| 4,170,529 A | 10/1979 | Freeman |
| 4,988,427 A | 1/1991 | Wright |

(Continued)

OTHER PUBLICATIONS

"Dense Medium Separation Using a Teetered Bed Separator", K.P. Galvin, et al., Gravity '99, Mar. 1999.

(Continued)

*Primary Examiner* — David A Reifsnyder
(74) *Attorney, Agent, or Firm* — Derek V. Forinash; Porter Hedges LLP

(57) ABSTRACT

An apparatus is disclosed for separating minerals in drilling fluid based primarily on density. The separator creates and maintains a slurry with a controllable density for separating minerals from drill cuttings. The density is controlled through the use of an electric coil and magnets to create a magnetic field or electrode array. The separator comprises a primary separation chamber containing the dense slurry, and a multiple number of secondary separation chambers used to separate cuttings from the drilling fluid. The invention also contains inlet hardware allowing the mixed mineral suspension to enter the first separation chamber, and hardware allowing the three outlet (separated) streams to exit the device. One of the three outlet streams carries the minerals that have a density greater than the user selectable density set point, while the second carries the minerals that have a density less than the density set point, and the third carries clean drilling fluid.

13 Claims, 11 Drawing Sheets

(51) Int. Cl.
 *B01D 21/26* (2006.01)
 *E21B 21/06* (2006.01)

(56) References Cited

U.S. PATENT DOCUMENTS

| | | |
|---|---|---|
| 5,858,199 A | 1/1999 | Hanak |
| 6,530,438 B1 | 3/2003 | McIntyre |
| 8,715,506 B2 | 5/2014 | Larson |
| 2011/0017600 A1 | 1/2011 | Larson |
| 2011/0017675 A1 | 1/2011 | Larson |

OTHER PUBLICATIONS

"Electro-Magnetorheological Fluids Dispersing Zeolite Particles Containing Iron", A. Shibayama, et al., International Journal of Modern Physics B, 2002.

"Magnetic Stabilisation of a Liquid Fluidised Bed", Y.Y. Hou, et al., Powder Technology, 2002.

"Relationship Between Chain Structures and Viscosity in the Magneto-Rheological Suspensions Stable Dispersing Different Concentration of Iron Particles with Smectite", A. Shibayama, et al., International Journal of Modern Physics B, 2002.

Sepro Systems, Falcon 'C' Gravity Concentrator, www.seprosystems.com, 2008.

APPARATUS AND METHOD FOR DRILLING FLUID DENSITY SEPARATOR USING MAGNETS

PRIORITY

This application is a continuation of U.S. application Ser. No. 12/841,760, filed Jul. 22, 2010 which claims the benefit of U.S. Provisional Application No. 61/227,961, filed on Jul. 23, 2009, entitled "SYSTEM AND METHOD FOR DENSITY SEPARATOR FOR DRILLING FLUID," also naming Thomas R. Larson as Inventor, which is hereby incorporated by reference in its entirety.

FIELD OF THE INVENTION

The present invention relates generally to material separators, and specifically to a density separator for drilling fluid.

BACKGROUND OF THE INVENTION

Drilling mud has been utilized in hydrocarbon reservoirs for many years. The mud is used to establish a proper rate of penetration of the drill bit into the hole. Many variables, such as the desired hole depth, are considered when determining the necessary properties of the mud, and what materials are required to achieve the required consistency. The mud may include minerals called barite or hematite, both of which are very dense. Other components in the mud may include a clay mineral that is intended to seal and lubricate the wall of the hole and create a specific rheology in the drilling mud.

As the hole is drilled, drilling mud is constantly pumped down to the drill bit in order to clean the cuttings away from the bit. The mud then returns to the surface, carrying the drill cuttings with it. The spent drilling mud comprises a variety of materials, such as sand, clay, barite, hematite and/or drill cuttings, for example. The barite and hematite are added to the mud in order to increase the fluid density, and these minerals are very expensive. As such, there are a variety of conventional techniques to recover these minerals with the drilling fluid for re-use, while separating the drill cuttings for discard.

One of the conventional separation techniques utilizes a screen, which separates the particles in the mud based on size. However, the disadvantage to such a method occurs when the sizes of the cuttings are substantially the same size as the barite or hematite. As such, the screen is ineffective in isolating the barite or hematite. A second common separation technique is the centrifuge. This machine uses high acceleration forces in order to pin dense particles to the wall of a spinning chamber where they are removed and recovered. However, the disadvantage to this method is that coarser undesirable drill cuttings also become pinned to the wall together with the dense minerals. Therefore they are also recovered, even though it is more desirable to discard these particles.

In view of the foregoing, there is a need in the art for a separator to overcome or alleviate the before mentioned shortcomings of the prior art.

SUMMARY OF THE INVENTION

The present invention provides apparatuses and methods to separate minerals based primarily on density, with only a minimal interference from the effect of particle size. The invention consists of a separator that creates and maintains slurry with a controllable density which, for example, can be targeted between 3.0 and 3.9 kilograms per liter for separating barite from drill cuttings. An exemplary apparatus includes a housing having a fluid inlet for the fluid mixture, at least one rotating disk (or a stack of disks) positioned inside the housing. The disks include an electrode array to suspend a first material of the fluid mixture, thereby separating a second and third material from the fluid.

The present invention works by maintaining a controllable magnetic field within a specifically designed portions of the disk, together with the addition of magnetic particles such as finely ground magnetite or ferrosilicon. The density of the resultant slurry within the controllable magnetic field depends on the strength of the field, which is controlled by power supplied to electric coils.

This invention is further designed to recover barite or other weighting agents from spent drilling fluid. Alternative applications exist in the mineral processing industry, to concentrate any mineral with a density that is substantially greater than the density of the surrounding gangue rock, and which already requires some size reduction to achieve liberation. These potential applications include: barite mining, galena (lead), titanium, gold, iron ore, and coal mining applications.

DESCRIPTION OF ILLUSTRATIVE EMBODIMENTS

Illustrative embodiments of the invention are described below as they might be employed to separate and recover expensive drilling fluid additives and other desired materials. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description and drawings.

Figure 1:
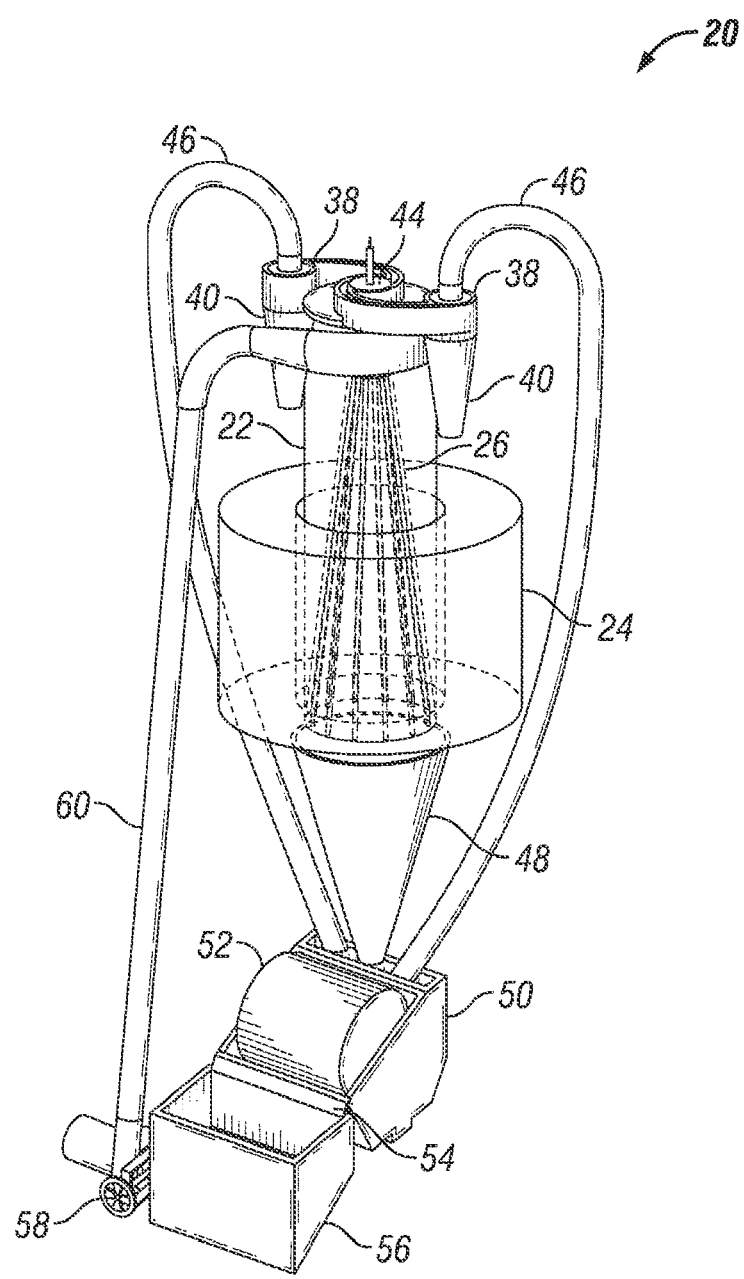
FIG. 1 is a three-dimensional view of a density separator according to an exemplary embodiment of the present invention.
Figure 1A:
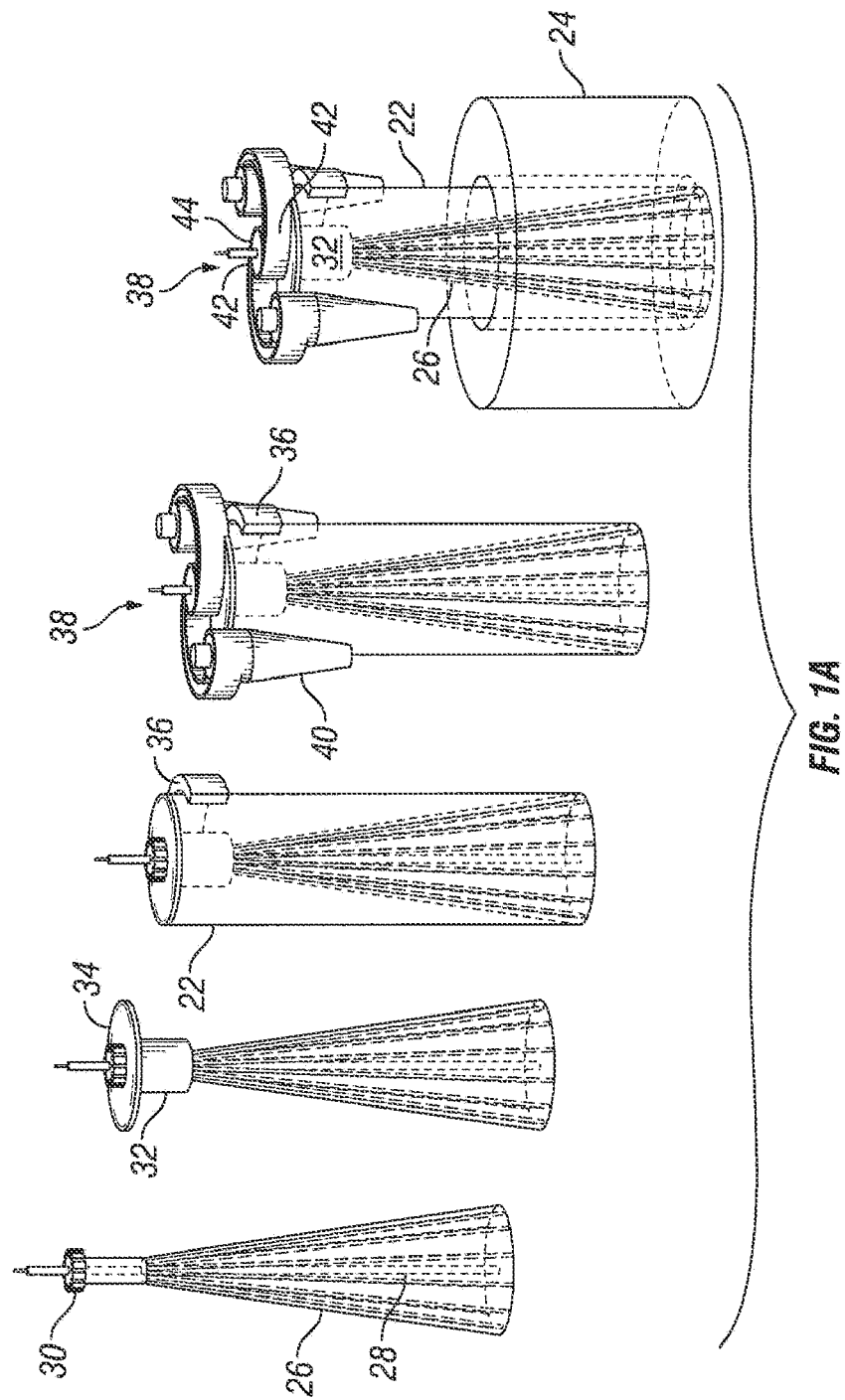
FIG. 1A is a break-away view of the primary chamber, secondary chamber and coil illustrated in FIG. 1.
Figure 1B:
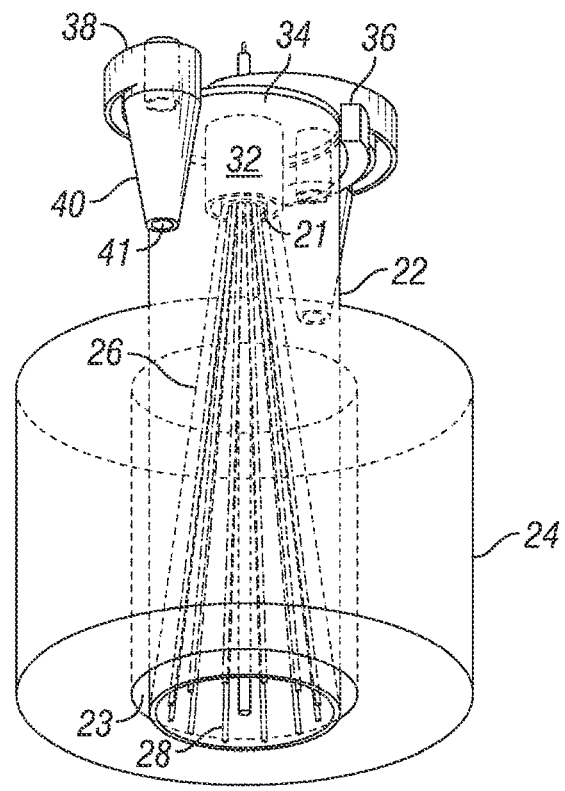
FIGS. 1B-1D illustrate exploded views of the density separator as illustrated in FIG. 1.

FIG. 1 illustrates an exemplary embodiment of a density separator 20 in accordance with the present invention. Density separator 20 includes a primary separation chamber 22 having an electrode array. In this embodiment, the electrode array comprises a coil 24 surrounding primary chamber 22 which may be, for example, a hollow copper wire. FIG. 1A illustrates an exemplary break away view of density separator 20 and the associated components. FIG. 1A illustrates a series of five images of increasing complexity, arranged like an assembly procedure, from left to right. In reference to FIGS. 1 and 1A, primary separation chamber 22 extends all the way down to the bottom of the coil 24 and a little bit beyond the bottom of the coil 24, as shown in FIG. 1B.

In addition, the electrode array comprises a conical core 26 located inside primary chamber 22, having a plurality of permanent magnets 28 (FIG. 1A) located inside. Core 26 is hollow and sealed at the bottom. Although not illustrated, core 26 will have bearings on either end of it to facilitate spinning. Magnets 28 are stationary with respect to core 26 and are attached to the inner wall of core 26. Although described as a plurality of magnets, those ordinarily skilled in the art having the benefit of this disclosure realized there may be only one magnet if desired. Magnets 28 are treated in this embodiment as permanent magnets, however those ordinarily skilled in the art having the benefit of this disclosure realize electromagnets may also be utilized.

Figure 1C:
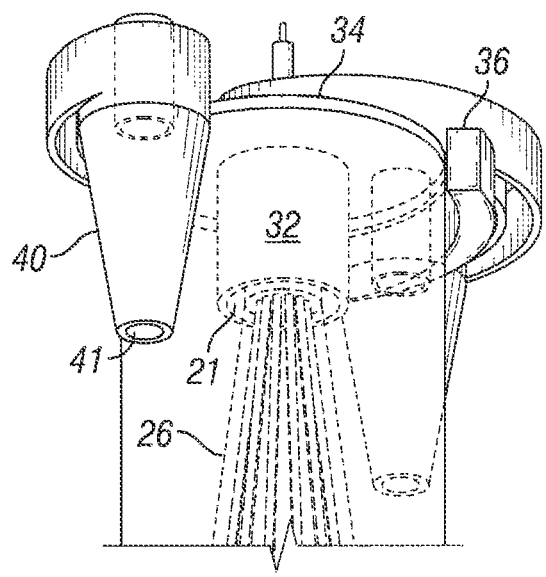

A pump impeller 30 is attached to the top of core 26. Impeller 30 rotates on a vertical axis instead of the more commonly used horizontal axis. A cylindrical portion 32 and plate 34 are located just below impeller 30 forming the suction pipe and suction side wall of the centrifugal pump casing. A hole extends all the way through the plate 34 and cylindrical portion 32 in order to facilitate the passage of fluid into the pump impeller from below. Cylindrical portion 32 does not contact the core 26 because, at the bottom of cylindrical portion 32, there is a gap 21 between the inside wall of cylindrical portion 32 and the outside wall of core 26, as shown in FIGS. 1B and 1C. Accordingly, fluid from inside primary chamber 22 will be pressurized and sucked upwardly through the gap 21 and into cylindrical section 32, up through plate 34 and into impeller 30, were the fluid is then pumped outwardly by impeller 30 into the secondary separators 40.

Figure 1D:
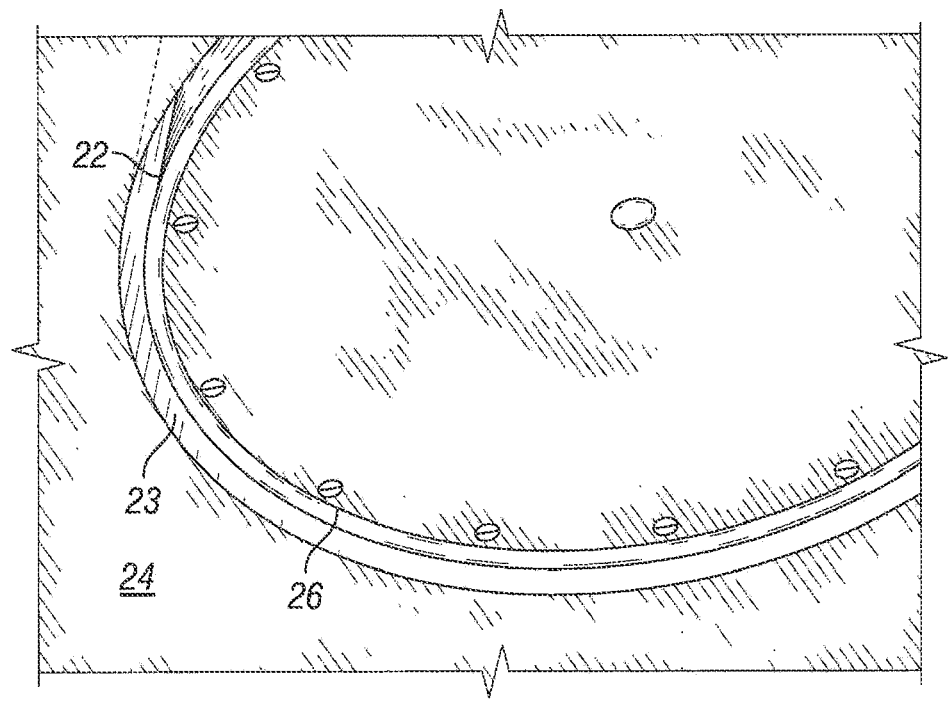

Referring to FIG. 1D, chamber 22 is slightly larger in diameter than the lowermost end of core 26. As such, there is a gap 23 in between the two at the very bottom of the device. Referring to FIGS. 1A-1C, an inlet 36 is coupled to the upper end of primary chamber 22, which is where the pumped fluid enters chamber 22 via an opening (not shown) into chamber 22. Once fluid enters, it begins swirling around the inside of chamber 22. Since the fluid is being pumped, there is some pressure on the fluid as it enters the inlet 36. The coil 24 and feed pump work together to generate the circular motion because, as the feed pump pumps fluid into primary chamber 22, the fluid will already be spinning to some degree and then the core 26 is also spinning because of the interaction with coil 24.

Referring to FIGS. 1-1D, as previously described, there is a gap 23 between the lowermost end of core 26 and primary chamber 22, which allows material to fall out the bottom of chamber 22. As the fluid entering chamber 22 spins, the heavy materials in the fluid are pinned to the outer wall of chamber 22 and eventually fall out of the bottom of chamber 22 through the circular gap 23. Accordingly, the dense material is removed from the fluid while the lighter material exits chamber 22 up through the gap 21 between cylindrical section 32 and core 26, where the light material is then hit by the blades of impeller 30 and pumped outwardly.

As the fluid is pumped outwardly by impeller 30, the fluid enters a secondary separation chamber 38, which consist of two hydrocyclones 40. Cyclones 40 also have inlets 42 (FIG. 1A) which are in fluid communication with central chamber 44 covering impeller 30. Central chamber 44 is a sealed chamber which fits atop impeller 30. Accordingly, since fluid exits chamber 22, and is pumped into inlets 42 by impeller 30, through the attached curved channels, and into cyclones 40, then these parts working together essentially create a centrifugal pump. Although this exemplary embodiment only utilizes two cyclones, those ordinarily skilled in the art having the benefit of this disclosure realize more or less cyclones may be employed as desired.

The fluid exiting the top of chamber has two components. It has a liquid component and a lower density drill cuttings, resulting in a solid material/liquid mixture. As the fluid mixture exits the top of chamber 22, it is being supercharged by the impeller 30, and then is sent at a relatively higher pressure into the two other hydrocyclones 40. Accordingly, a second separation occurs here in addition to the first separation occurring in chamber 22. However, unlike chamber/hydrocyclone 22, hydrocyclone 40 does not have a magnetic core; rather, only the centripetal acceleration due to the fluid velocity is used to separate the drill cuttings and fluid. Therefore, the fluid exits the top of cyclone 40 while the more dense material (e.g., drill cuttings) exits the bottom of cyclone 40 via a hole 41 (FIGS. 1B & 1C) and will flow into a hose or some other transferring means attached to cyclone 40 (also not shown). In the alternative, the material may be dumped into some container and carried away periodically. Simultaneously, the less dense fluid comes out at the top of cyclone 40 via an opening at the top and enters hoses 46.

In further reference to FIGS. 1 and 1A, electric coil 24 is coupled around chamber 22. The fluid which is fed into separator 20 also contains magnetite, ferrosilicon, or any other permanently magnetic material of a suitable particle size distribution. Magnetite is a mineral that is naturally magnetic. In the present invention, a concentration of magnetite powder is fed into the chamber 22 as it is part of the spent drilling mud, resulting in a dense slurry having a bulk specific gravity between, for example, 2.5 and 4.5. In another exemplary embodiment, the bulk specific gravity is ideally between, for example, 3.1 and 3.5. Flow line mud also forms part of the fluid feed.

The interaction of the electric field between the permanent magnets 28 in the spinning core 26 and the electric coil 24 creates a magnetic field gradient which essentially holds the magnetite particles within the slurry in that part of the chamber 22. The magnetite mineral as a pure mineral has a specific gravity around 5, and water is around 1. Therefore a slurry that has a volume percent of at least 25% will double the density of the fluid inside chamber 22. The magnetic field, which can be controlled by regulating the current through coil 24, as understood in the art, provides control over the density of the fluid that is inside the chamber 22.

In operation, the dense fluid inside chamber 22 is forced to the bottom of chamber 22 because of the high density of the magnetite slurry adjacent to coil 24. The density of this slurry allows higher density particles to fall into, through, and then below the suspended magnetite slurry, while tower density particles float above the slurry. If a particle of a light density enters the section of the chamber 22 that has a high density, it will effectively float on top, which facilitates the less dense material being sucked into cylinder 32. Accordingly, the magnetite slurry concentration is used as a density gauge to distinguish what is considered to be a more dense material from a less dense material. By varying the power supply to coil 24, the density of the magnetite slurry can be controlled which, in turn, controls the densities necessary to float one mineral above, and a different mineral below the magnetite slurry adjacent the coil 24. As such, greater current in the coil creates a greater magnetic field strength in the chamber 22, which then, because of the magnetite, creates a much higher density fluid. The fluid entering chamber 22 will also have weighting agents from spent drilling fluid, such as, for example, barite.

Referring to FIG. 1, an exemplary embodiment of the present invention also includes a catcher 48 below coil 24 which may be necessary due to the relative sizes of the machinery. Catcher 48 collects the more dense material coming out of the gap 23 between the lower end of chamber 22 and core 26. Once collected by catcher 48, the material falls into a magnetic separator 50 coupled to the bottom of catcher 48. Inside of the magnetic separator 50 is a permanent magnet 52 held at a angle inside of a rotating non-magnetic cylinder which carries the magnetite up and over the discharge lip 54 and into tank 56, as known in the art. Magnetite powder is added to tank 56 in order to get the process started. After a sufficient amount of magnetite is added to make the slurry dense enough, most of it should be recycled using the magnetic separator. Also, note some magnetite will need to be added continuously in order to replace the magnetite that is lost due to random it efficiencies that occur in the process.

Operation of the exemplary embodiment of FIG. 1 will now be described. In operation, spent drilling fluid is fed into tank 56, allowing pump 58 to deliver it into chamber 22 via inlet 36, together with the recycled magnetic concentrate. The fluid contains a mixture of fluid, drill cuttings, magnetite and barite, for example. The magnetic field created by the interaction between coil 24 and spinning core 26 forces the magnetite to suspend within the field (chamber area between coil 24 and core 26). As such, the less dense drill cuttings in the fluid are forced to the top of chamber 22 above the magnetite, while the denser barite falls through the suspended magnetite to the bottom of chamber 22. Therefore, the material coming out of the bottom of the chamber 22 consists of both the magnetite particles that escape the field as well as the barite particles and some liquid. After the cuttings and fluid are pumped through secondary separator 38, hoses or pipes 46 carry clean liquid from hydrocyclone separators 40 into separator 50 while, simultaneously, the drill cuttings fall out the bottom of hydrocyclones 40.

The clean fluid flowing through hoses 46 are then collected in separator 50, along with the more dense material falling from chamber 22. As such, the collected mixture includes magnetite, barite, and liquid. Because of the magnetic properties of the magnetite, magnet 52 separates the magnetite from the barite, where the magnetite then falls over the overflow lip 54 into another tank 56 where it may be re-used. A pump 58 is coupled to tank 56 in order to pump the magnetite from tank 56, through hose or pipe 60 and back into chamber 22. The liquid and barite remaining in separator 50 then flows out of the bottom of the separator 50 via an opening (not shown) where the barite may be reused. As desired by the final operator, hoses or pipes 46 may also be directed to additional separations further downstream, such as to the inlet of a centrifuge. In that case, the volume of liquid required to operate separator 50 properly would need to be provided by the cleaned fluid exiting the centrifuge, or via the addition of other liquid mud additives that are normally available on the rig, and would be added anyway to maintain other mud properties.

Figure 2:
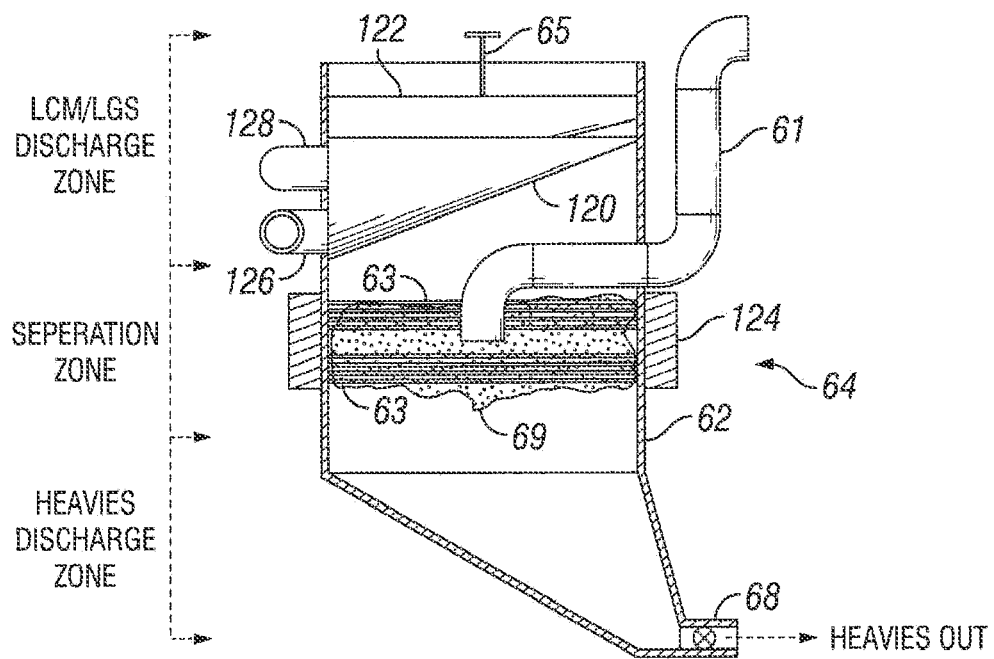
FIG. 2 is a sectional view of a density separator according to an exemplary embodiment of the present invention.
Figure 2A:
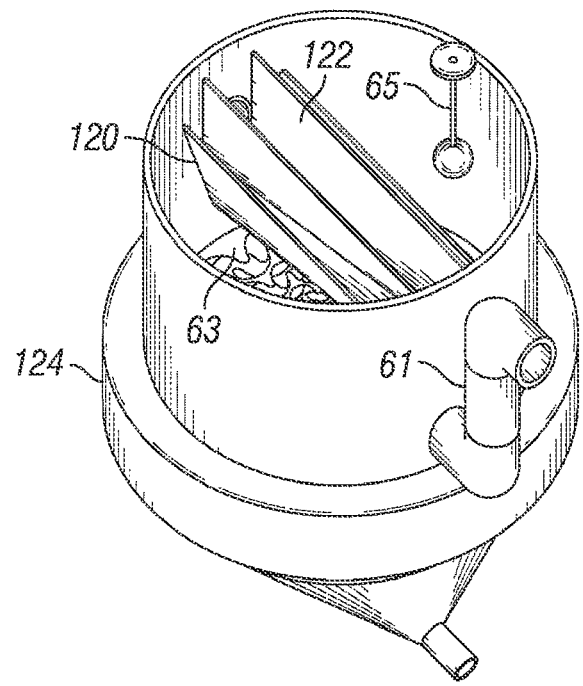
FIG. 2A is a three-dimensional view of the density separator of FIG. 2.
Figure 2B:
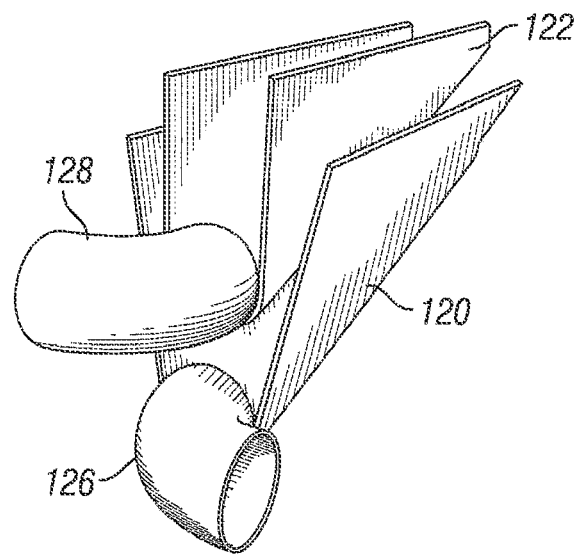
FIG. 2B is a break-away view of the two overflow troughs of the density separator illustrated in FIG. 2.

Referring to FIG. 2, an alternative exemplary embodiment of the present invention is disclosed. This embodiment comprises a single column vessel, which itself includes several distinct zones, as illustrated in FIG. 2. The uppermost zone is the Low Gravity Solids/Lost Circulation Material ("LGS/LCM") discharge zone, and consists of a lower launder 120 and an upper launder 122 which is positioned inside of and above lower launder 120, as shown in FIGS. 2, 2A and 2B. Lower launder collects LGS minerals and discharges them out of outlet 126. Upper launder 122 collects either clean drilling fluid or LCM materials if they are present in the mud system, and discharges them out of outlet 128. LGS represents low gravity solids (i.e., light density material or low specific gravity material such as clay, drill cuttings, shale, etc.). LCM represents lost circulation material which is a specialty material having even lighter density.

The middle zone is the feed separation zone, consisting of an electrode array 64 charged with either DC or AC current. In this exemplary embodiment, array 64 consists of a series of eight stationary electromagnetic plates 63 positioned inside column 62. A wire coil 124 is positioned and around the plates 63 external to the separation zone, given that the mild steel structures (e.g., plates 63) will transmit the magnetic field into the desired location and the desired shape. Coil 124 may also be incorporated into the internal structure in order to minimize transmission losses of the magnetic fields. In this exemplary embodiment, the plates 63 should not have any two plates approach each other by a distance of about ¼ inch. This feature prevents tramp oversize particles from clogging the device.

The electrode array 64 has been designed to maximize the field gradient. Magnetic force is a product of the field strength and the field gradient. Therefore, maximizing the gradient (by mechanical means) also maximizes the magnetic force for any given field strength. Geometrically, plates 63 consist of a large number of points and arcs, as illustrated in the exemplary embodiments of FIGS. 2C and 2D. Plates 63 have been designed to maximize and control the gradient contribution to the force via a combination of points 63a and arcs 63b of opposite magnetic poles, arranged in a generally even spacing throughout the area of column 62. Although not shown, the various pieces of plate 63 illustrated in FIG. 2C would have to be held together by some means, such as a spacer, for example. Those ordinarily skilled in the art having the benefit of this disclosure realize there are a variety of other coupling means.

Figure 2C:
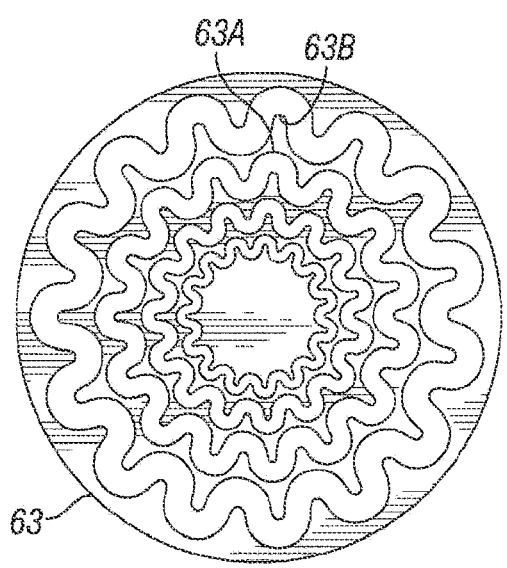
FIGS. 2C-2D are two views of electrode arrays according to an exemplary embodiment of the present invention.
Figure 2D:
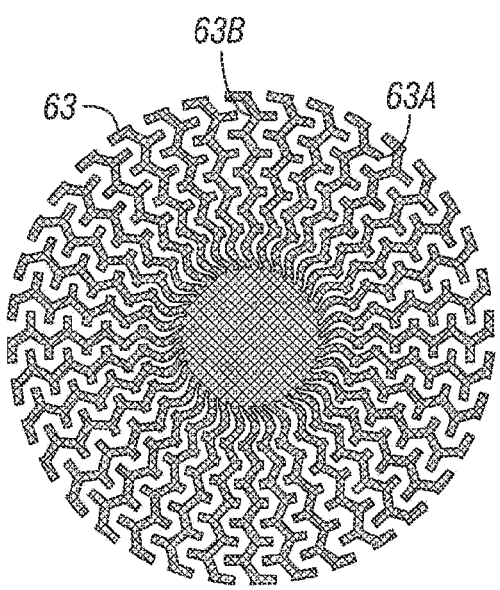

As shown in FIGS. 2C and 2D, points 63a are positioned in the center of arcs 63b. During testing of the present invention, it was discovered that the filed gradient can be maximized by arranging points 63a and arcs 63b in opposite orientation of one another. Strength and gradient are equally important to magnetic force. However, points and arcs dramatically increase gradient, which can expand and control the distribution of the magnetic force throughout the interior of a large vessel at a much reduced power level than necessary to achieve similar forces using an exterior coil alone. In an alternate embodiment, as shown in FIG. 2F, the field characteristics (e.g., strength and gradient) can be manipulated by wrapping a coil around the plates at various positions, as would be understood by one ordinarily skilled in the art having the benefit of this disclosure. Moreover, in view of this disclosure, those same skilled artisans understand plates 63 can be designed utilizing a variety of other geometric shapes.

Figure 2E:
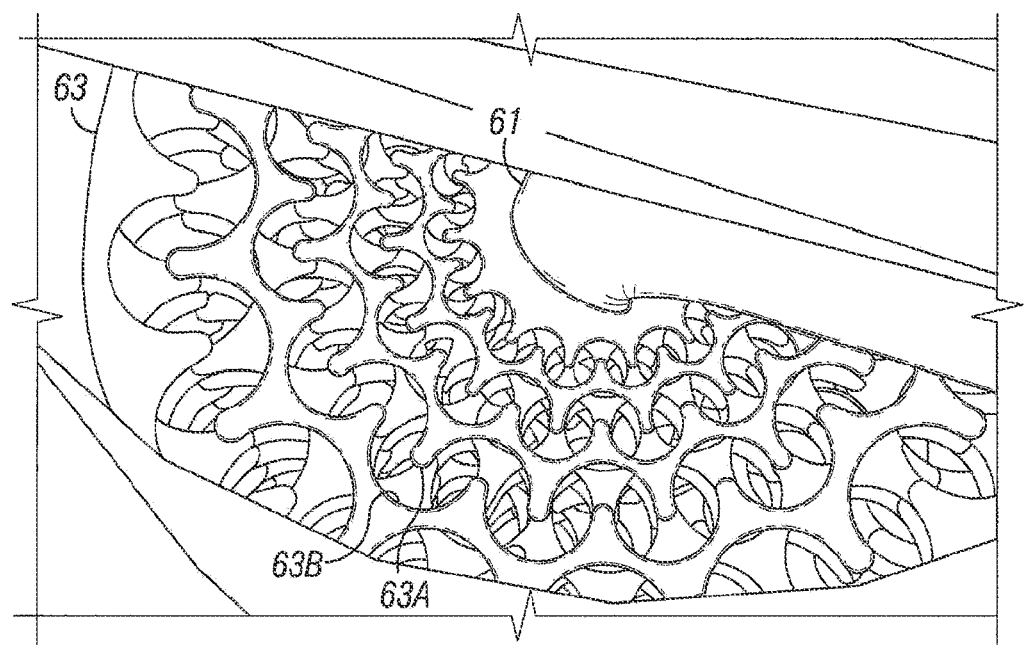
FIG. 2E is and exploded view of the interior of the primary chamber of the density separator illustrated in FIG. 2A.
Figure 2F:
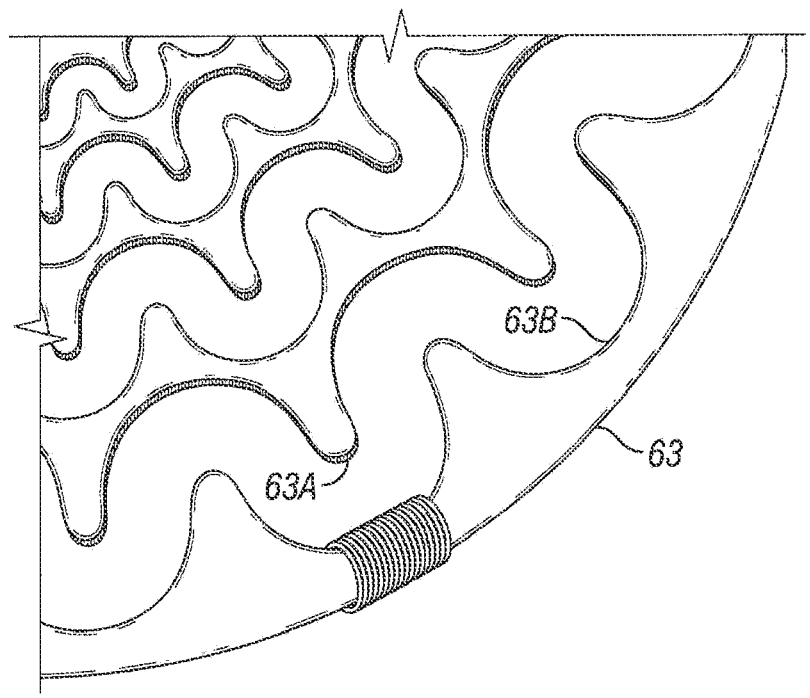
FIG. 2F illustrates a coil wrapped around a portion of a plate according to an exemplary embodiment of the present invention.

Furthermore, in reference to FIG. 2E, adjacent plates 63 are axially offset ½ are length from each other. This feature reduces the probability that the feed fluid will travel straight through a hole in the series of plates, bypassing the magnetic materials.

DC current creates a stationary magnetic field between the pairs of plates 63, which will hold a concentration of magnetite powders within the fluid, depending upon the current. An AC current will create a similarly shaped field. However, when the magnetite particles are sized smaller than their own magnetic field domain, the particles rotate in place with an rpm value equal to the frequency of the AC current. The individual particle rotations may be very advantageous for enhancing the bulk flow of the non-magnetic particles within the fluid. Needless to say, the frequency, amperage, and the overall combination of DC current and AC current, as well as the orientation and geometry of the plates, are all subject to optimization as would be understood by one ordinarily skilled in the art having the benefit of this disclosure.

Referring to FIGS. 2-2E, in operation, feed tube 61 will discharge fluid within column 62 between the upper plates 63 and lower plates 63 as shown. In this exemplary embodiment, there are four upper plates 63 and four lower plates 63, with tube 61 discharging in the area between them, in order to ensure the new feed will be surrounded by the suspended magnetite slurry. Although described in relation to eight plates total, those ordinarily skilled in the art having the benefit of this disclosure realize more and less plates may be utilized. In addition to other materials as described herein, the fluid also contains magnetite. As the fluid enters the separation zone, the magnetite slurry becomes suspended in the magnetic field produced by array 64 and surrounds the incoming feed.

The flow through the column 62 will depend on the incoming feed rate, in such a way that the level is held constant by the level control float 65 and the control valve 68 at the bottom. A non-contact level detector (not shown) may be mounted above the float 65 in order to sense the float position. The detector/sensor could be any one of a variety of styles available for this purpose. Referring to FIG. 2B, the weir height of lower launder 120 is lower than the weir height of upper launder 122. Level control float 65 will be calibrated such that the fluid level in column 62 is maintained between the top of the upper and lower weirs, thereby allowing two different materials to be extracted from the fluid. Also, although not shown, lower launder 120 contains a control valve in outlet 126 which is used to restrict the flow out of launder 120, thereby allowing the liquid level to rise above the overflow weir of launder 120. Restricting flow here allows material to flow into the upper launder 122. In essence, this controls the effective "width" of the launder 120 hydraulically, not mechanically, and therefore without using any moving parts.

Further referring to FIGS. 2-2E, fluid, having both dense and less dense material as previously described, is fed via inlet tube 61 and enters a chamber 62 that has suspended magnetite that is held in place by electrode array 64. Inside chamber 62, heavy materials fall through the suspended magnetite slurry 69 and fall out the bottom, while the lighter weight materials will drift up and out the top of the suspended magnetite slurry 69. The lighter weight materials create overflow at the top of chamber 62. Level control float 65 maintains the fluid level between or above the tops of the upper and lower weirs of the launders, as previously described. In some drilling circumstances, the lightest material, such as organic LCM particles (in the lighter weight material which has floated above the magnetic separation zone), will create a froth-like mixture that floats atop the fluid level and will be collected in upper launder 122, while the liquid material (also in the light weight material) will be collected in lower launder 120. Those ordinarily skilled in the art having the benefit of this disclosure realize a modified flotation column may be used for this purpose. In an alternative embodiment, a "Wash Water" tank can be added above the column to rinse the LCM materials of all LGS material.

As in the previous embodiment, the alternate embodiment of FIG. 2 creates magnetite slurry that has a high density. The feed is pumped into the middle of this fluid providing enough turbulence in chamber 62 to cause the barite or other heavy minerals to fall through the suspended magnetite down to the bottom. The density of the suspended magnetite 69 is so great that the lighter material will be lifted out and above. Control valve 68 at the bottom of column 62 can be adjusted so that the bulk of the liquid goes up. Between the feed in and overflow there is an upward velocity of fluid such that the fluid is dragging lighter particles upwardly out of the suspended magnetite 69; however, the barite will fall through the suspended magnetite due to its density. In this embodiment, the flow in and flow out will be controlled by control means, such as level control float 65 and valve 68, in order to optimize the separation process as would be understood by one ordinarily skilled in the art having the benefit of this disclosure. Such control means are known in the art.

Figure 3:
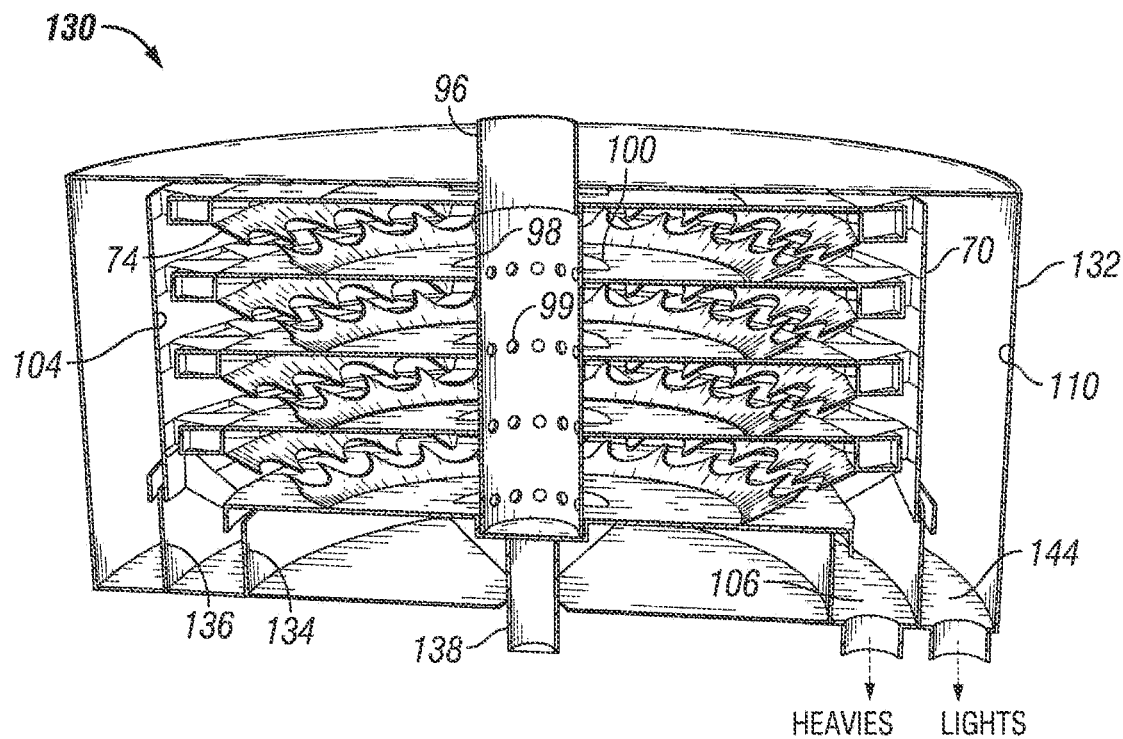
FIG. 3 is a sectional diagram of a density separator according to an exemplary embodiment of the present invention.

Referring to FIG. 3, another exemplary embodiment of the present invention is illustrated. This embodiment comprises is a modular design consisting of multiple circular separation disks 70 stacked in a single device 130. Although illustrated as having four disks 70, those ordinarily skilled in the art having the benefit of this disclosure realize more or less disks may be utilized. FIGS. 3A-3D illustrate exploded vie s of a single disk 70 as described below. Device 130 includes a stationary housing 132. At the bottom of housing 132 is an inner wall 134 and an outer wall 136, both extending from the base of housing 132. The stack separation disks 70 are stacked atop walls 134, 136 as illustrated and described below.

A stationary feed pipe 96 is located at the upper end of housing 132, which feeds the fluid into device 130. Feed pipe 96 feeds into a feed chamber 98 which includes a series of holes 99 spaced circumferentially there-around which are used to feed fluid from chamber 98 into disks 70. Flow-limiting plates can also be installed within chamber 98 in order to control how the feed is split between the disks 70. Pipe 98 also serves to hold disks 70 in place. Unlike the previous embodiments, the assembly of stacked separation disks will be mounted on hardware enabling them to rotate. The hardware (not shown) will be attached to the shaft 138 which extends from the bottom of the stacked disks 70 and out of the bottom end of housing 132. As the hardware rotates shaft 138, stacked disks 70 and chamber 98 will rotate, while housing 132 and feed pipe 96 remain stationary. Each disk 70 will contain a positive and negative electrode array 74 similar to the embodiment of FIG. 2. Array 74 is comprised of a sloped positive and negative wall. Those ordinarily skilled in this art having the benefit of this disclosure realize a variety of arrays may be utilized.

Figure 3A:
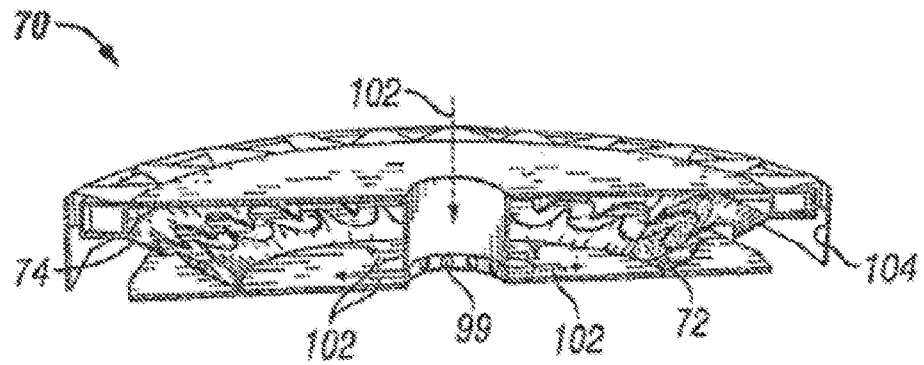
FIG. 3A is an exploded view of a disk as illustrated in FIG. 3.
Figure 3B:
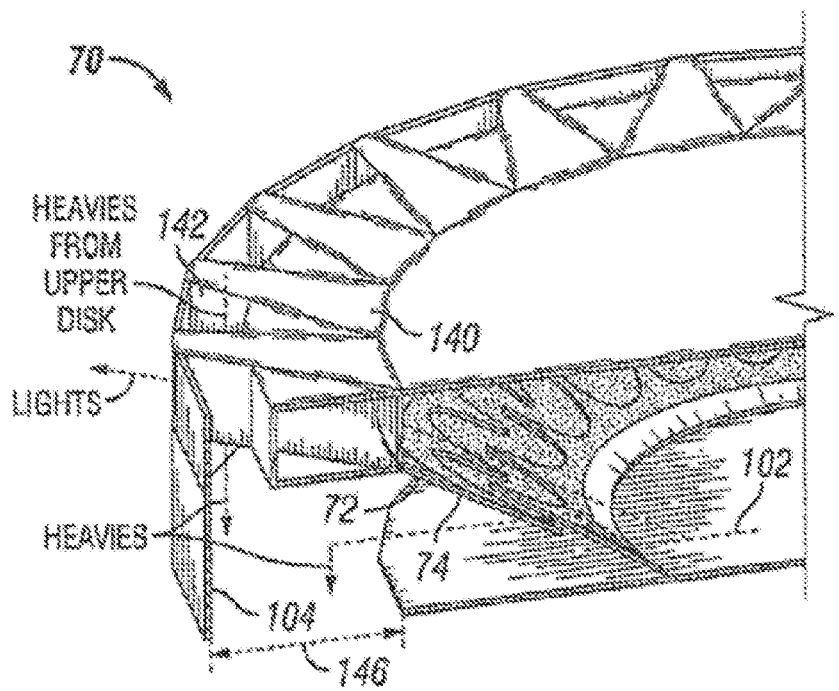
FIG. 3B is an exploded sectional view of a disk showing the direction of flow of light and heavy material through the disk.

In operation, stationary feed pipe 96 discharges fluid into the feed chamber 98 at the center of the stack of separating disks 70. Each disk 70 has a passage section 100 extending from chamber 98 into disks 70 allowing a limited amount of feed 102 to travel from chamber 98 into each disk. Referring to FIGS. 3A and 3B, the feed 102 travels along the lower surface of each disk 70, until it reaches the magnetite slurry 72. There, the heavy minerals flow through magnetite slurry 72, while the light minerals flow upward and over magnetite slurry 72. Spaced circumferentially around each disk 70 are a series of trapezoidal chutes 140 which receive the lights. The heavies continue traveling outward until they reach an internal rotating wall 104, which directs them downward through the device.

Figure 3C:
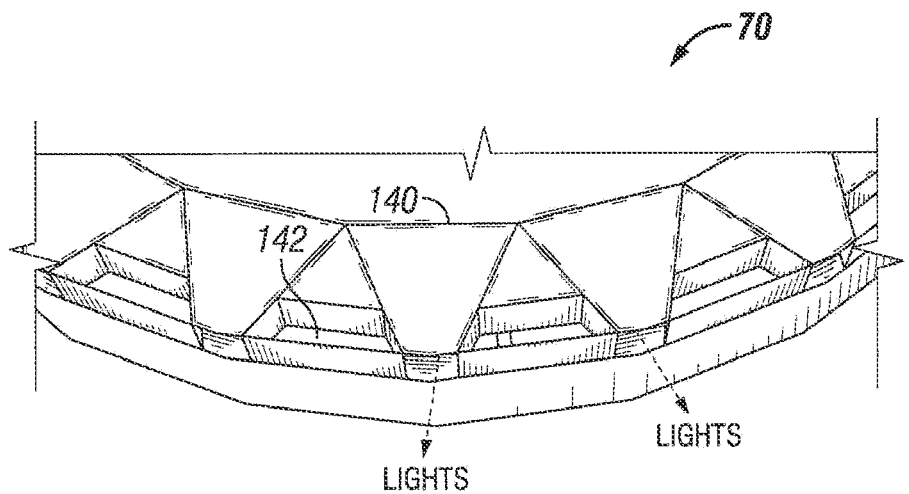
FIG. 3C is an isometric view of a disk as illustrated in FIG. 3.
Figure 3D:
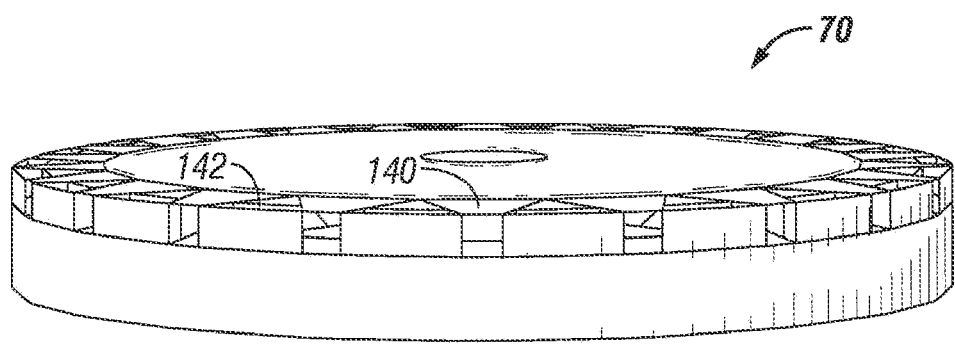
FIG. 3D is a three dimensional view of the disk as illustrated in FIG. 3.

As shown in FIGS. 3B and 3C, the heavies from upper disks 70 fall through an opening 142 of the disks 70. In FIG. 39, each disks 70 contains an opening 146 extending from its lower surface out to inner rotating will 104. Although not shown in FIG. 3B, the opening 142 of another disk 70 would be located beneath the illustrated disk 70 whereby the heavies would fall through (unless the illustrated disk was the lowermost disk—in such case, the heavies would fall into chamber 106).

Eventually, the heavies are collected in a non-rotating chamber 106 (FIG. 3) that collects them and discharges them out the bottom of the housing 132. The lights travel outwardly inside disk 70 and through trapezoidal chutes 140 to a non-rotating outside wall 110, and fall to the bottom of the device 130 where a chamber 144 collects them. The lights may then exit chamber 144 via the outlet as shown.

In this embodiment, when the rotation speed is fast enough, the gravity force pulling straight down is inconsequential compared to the centripetal acceleration force that pushes material toward the outside wall of the apparatus. As feed 102 enters the chamber 98, the centripetal force pulls the fluid to the right and left away from the feed pipe 96. Suspended magnetite is held in place by the magnetic field established between the two sloped electrode walls of electrode 74. The region of suspended magnetite 72 also exists on the right hand side, but is not shown for clarity. One sloped electrode wall is charged in one way, and the other wall is charged in the opposite way, so that a voltage applied between the two walls creates a magnetic field that holds the magnetite in place. The two sloped electrode walls are indicated by arrows on the right hand side of FIG. 3A, but the walls also exist on the left.

As previously described, the amount of suspended magnetite 72 can be controlled by the voltage supplied through the electrode array 74, which may be either DC or AC voltage. Accordingly, the light material floats above this high density separation zone and the heavy material travels straight through it. As such, the magnetite remains in place but the barite will be pressed through the rotating, mixing chamber of high density magnetite slurry in order to get out of the apparatus.

Figure 4:
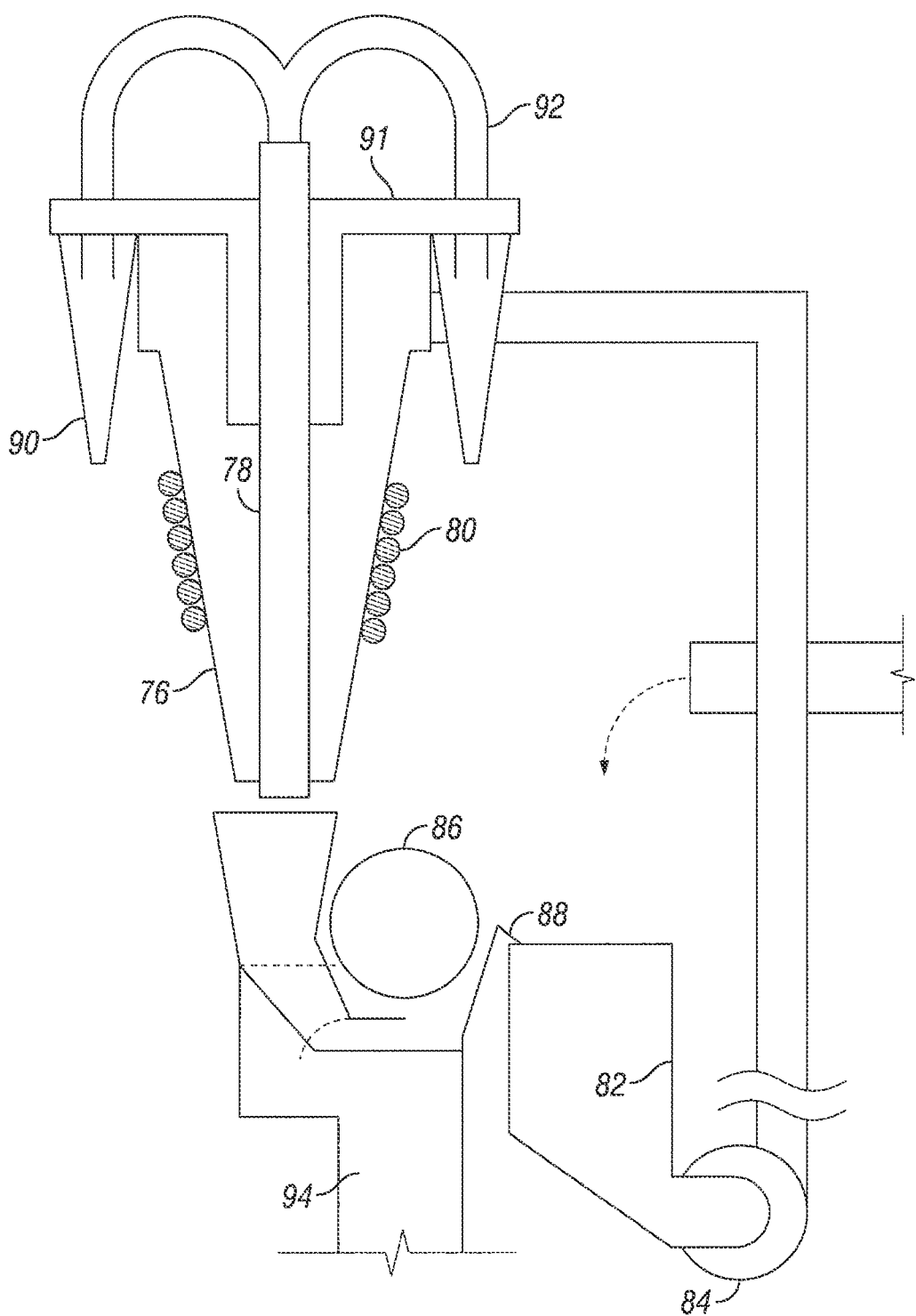
FIG. 4 is a diagram of a density separator according to an exemplary embodiment of the present invention.
Figure 4A:
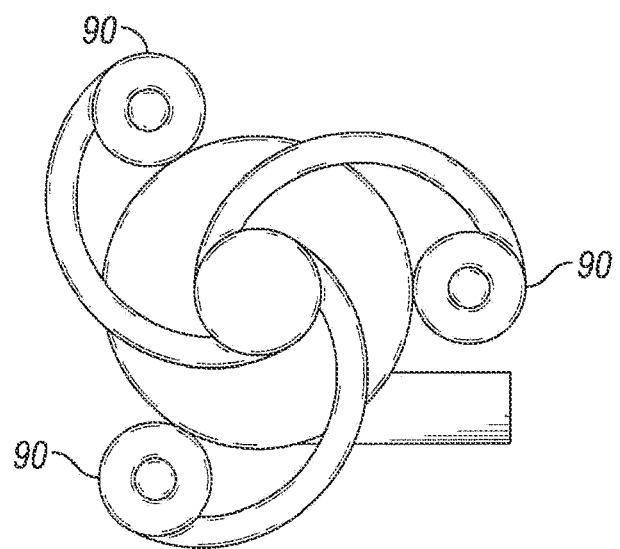
FIG. 4A is a top view of the density separator illustrated in FIG. 4.

Referring to FIG. 4, another alternative exemplary embodiment of the present invention is illustrated. This embodiment is very similar to the design and operation of the embodiment of FIG. 1, with a few exceptions. In this embodiment, a conical chamber 76 is utilized along with a mating coil 80 to provide the electric field. Instead of a conical shaped magnetic core, core 78 is a pipe. In operation, the new feed enters a feed box 82 sitting above a pump 84. The fluid feed is then pumped into the primary hydrocyclone 76 and it swirls around the inside of chamber 76 until it reaches coil 80. Here, as previously described, the magnetite is held in place. Thereafter, the heavier barite in the fluid and some magnetite will fall below the suspended magnetite and into the magnetic separator 86, while the lighter fluid and drill cuttings move up to the top of chamber 76 where it is eventually separated in secondary hydrocyclones 90 as previously described in relation to FIG. 1. In this embodiment, three secondary hydrocyclones 90 are illustrated as shown in FIG. 4A, and there is no centrifugal pump impeller.

Once the heavy material is collected in magnetic separator 86, the magnetite is discharged up and over lip 88 into box 82 where it is again mixed with the new feed fluid. The lighter materials forced up to the top of chamber 76 flows into secondary hydrocyclones 90 following the horizontal feed passageway 91. Heavier drill cuttings fall out of the bottom of secondary hydrocyclones 90. At the same time, the clean fluid is circulated up and out of the cyclones via pipes 92, where it recombines at pipe 78 and is discharged into magnetic separator 86. After the magnetite has been removed, only the fluid and barite remain. As previously described, it exits out of opening 94 for further use as desired.

The present invention is applicable in a wide range of industries, all of which require high processing volumes per installation, and would likely generate a high demand for a successful separating device. Such industries include, but are not limited to, drilling, mining of base, semi-precious and fossil fuels, as well as water treatment. The present invention may be applied to a variety of minerals requiring separation such as minerals with high specific gravity including, for example, barite, hematite, clay, shale, sand, hematite (Fe), magnetite (Fe), scheelite (W), wolframite (W), llmenite (Ti), galena (Pb), chalcopyrite (Cu), sphalerite (Zn), pyrite, ash forming minerals, fly ash, and specifically designed surface active absorbent minerals. Low specific gravity minerals include, for example, clay, shale, sand, lost circulation materials, quartz, coal, and clean water.

An exemplary embodiment of the present invention provides an apparatus for separating material from a fluid mixture, the apparatus comprising a housing having a fluid inlet for the fluid mixture; at least one disk positioned inside the housing, the at least one disk having an electrode array positioned therein to suspend a first material of the fluid mixture within the at least one disk; and a mechanism configured to rotate the at least one disk inside the housing, wherein a second material of the fluid mixture results above the suspended first material and a third material results below the suspended first material. In another embodiment, the housing is stationary. In yet another embodiment, the housing comprises a central chamber coupled to the fluid inlet and the at least one disk, the central chamber adapted to supply the fluid mixture to the at least one disk.

In another embodiment, the at least one disk comprises: an upper surface positioned adjacent the electrode array, the upper surface having a first fluid outlet adapted to receive the second material; and a lower surface positioned adjacent the electrode array, the lower surface having a second fluid outlet adapted to receive the third material. In yet another embodiment, the apparatus further comprises a non-rotating chamber beneath the at least one disk, the non-rotating chamber adapted to receive the third material exiting the second fluid outlet. In another embodiment, the first fluid outlet is an outer non-rotating wall and the second fluid outlet is an inner rotating wall. In yet another, the electrode array comprises a first and second sloped electrode. In another embodiment, the suspended first material is magnetite.

A exemplary methodology of the present invention provides a method for separating material from a fluid mixture, the method comprising the steps of: (a) supplying the fluid mixture to a housing having at least one disk positioned therein; (b) rotating the at least one disk; (c) collecting the fluid mixture in the at least one disk; and (d) suspending a first material of the fluid mixture in the at least one disk, wherein a second material of the fluid mixture results above the first suspended material and a third material of the fluid mixture results below the first suspended material. In another methodology, step (a) further comprises the step of providing an electrode array positioned inside the at least one disk. In yet another methodology, step (b) further comprises the step of causing the housing to remain stationary. In another methodology, step (d) further comprises the step of suspending the first material by utilizing magnetic properties of the first material, the second material resulting above the first material because the second material is less dense that the first material, and the third material resulting below the first material because the third material is more dense than the first material.

In another methodology, the method further comprises the step of adjusting an amount of the suspended first material by manipulating a magnetic field of the electrode array. In another methodology, the at least one disk comprises an upper and lower surface positioned adjacent the electrode array, the method further comprises the steps of: causing the second material to flow along the upper surface to a first fluid outlet; and causing the third material to flow along the lower surface to a second fluid outlet. In yet another, the method further comprises the step of causing the third material to exit the second fluid outlet and flow to a non-rotating chamber beneath the at least one disk. In another methodology, the first fluid outlet is an outer wall and the second fluid outlet is an inner wall, the method further comprising the steps of: causing the first fluid outlet to remain stationary; and causing the second fluid outlet to rotate. In yet another, the method further comprises the step of providing a first and second slope electrode within the electrode array. In another methodology, the method further comprises the step of providing the first material as magnetite.

Another exemplary embodiment of the present invention provides an apparatus for separating material from a fluid mixture, the apparatus comprising: a housing having a fluid inlet for the fluid mixture; a plurality of disks stacked atop one another positioned inside the housing, the disks each having an electrode array positioned therein to suspend a first material of the fluid mixture within each disk; and a mechanism configured to rotate the disks inside the housing, wherein a second material of the fluid mixture results above the suspended first material and a third material results below the suspended first material. In another embodiment, the housing is stationary. In another embodiment, the housing comprises a central chamber coupled to the fluid inlet and the disks, the central chamber adapted to supply the fluid mixture to the disks. In yet another, the disks each comprise an upper surface positioned adjacent the electrode array, the upper surface having a first fluid outlet adapted to receive the second material; and a lower surface positioned adjacent the electrode array, the lower surface having a second fluid outlet adapted to receive the third material.

In yet another embodiment, the apparatus further comprises a non-rotating chamber beneath the disks, the non-rotating chamber adapted to receive the third material exiting the second fluid outlets. In another embodiment, the first fluid outlet is an outer non-rotating wall and the second fluid outlet is an inner rotating wall. In yet another, the electrode array comprises a first and second sloped electrode.

While the invention is susceptible to various modifications and alternative forms, specific embodiments have been shown by way of example in the drawings and has been described in detail herein. However, it should be understood that the invention is not intended to be limited to the particular forms disclosed. Rather, the intention is to cover all modifications, equivalents, and alternatives falling within the spirit and scope of the invention as defined by the appended claims.

What is claimed is:

1. A system for separating material from a fluid mixture, the system comprising:
    a feed box to collect the fluid mixture and magnetic particles;
    a pump to pump the fluid mixture and a first material comprising the magnetic particles from the feed box into a primary hydrocyclone chamber; and
    an electric coil surrounding the primary hydrocyclone chamber,
    wherein the electric coil is configured to create a field so as to suspend the first material in the primary hydrocyclone chamber, wherein a second material of the fluid mixture results above the first suspended material and a third material results below the first suspended material in the primary hydrocyclone chamber.

2. The system of claim 1, wherein the system further comprises a second separator functionally connected to the primary chamber of the separator so as to receive the second material of the fluid mixture from the primary chamber of the separator, and wherein the second separator is adapted to separate a fluid from the second material.

3. The system of claim 2, wherein the second separator is a hydrocyclone.

4. The system of claim 1, wherein the second material of the fluid mixture is less dense than the fluid mixture comprising the suspended first material, and the third material of the fluid mixture is more dense than the fluid mixture comprising the suspended first material.

5. The system of claim 1, the system further comprising a magnetic separator functionally situated below the primary hydrocyclone chamber and adapted to catch the third material of the mixture as the third material exits the primary chamber.

6. The system of claim 5, wherein the magnetic separator houses a permanent magnet, wherein the magnetic separator is adapted to discharge the magnetic particles into the feedbox.

7. The system of claim 1, wherein the fluid mixture is drilling fluid.

8. The system of claim 1, wherein the electric coil comprises a copper wire.

9. A method for separating material from a fluid mixture, the method comprising the steps of:
    (a) supplying a first material comprising magnetic particles to the fluid mixture;
    (b) collecting the fluid mixture in a primary chamber of a hydrocyclone;
    (c) subjecting the fluid mixture to a magnetic field in the hydrocyclone; and
    (d) suspending the first material in the primary chamber, wherein a second material of the fluid mixture results above the first suspended material and a third material of the fluid mixture results below the first suspended material.

10. A system for separating material from a fluid mixture including drilling fluid, the system comprising:
    magnetic particles;
    a first separator to collect the fluid mixture;
    at least one magnet, wherein the at least one magnet is configured to create a magnetic field so as to suspend a first material of the fluid mixture containing the magnetic particles in a separation zone of the first separator, wherein a second material of the fluid mixture results above the separation zone and a third material results below the separation zone; and a second separator coupled to the first separator so as to receive the second material from the first separator, and wherein the second separator separates the drilling fluid from the second material;

a third separator coupled to the first separator so as to receive the third material from the first separator and drilling fluid, the third separator comprising a permanent magnet for separating the magnetic particles.

11. The system of claim 10, wherein the second separator is a hydrocyclone.

12. The system of claim 10, wherein the at least one magnet comprises a permanent magnet.

13. The system of claim 10, wherein the first separator comprises:

a feed box to collect the fluid mixture;

a primary hydrocyclone chamber;

a pump to pump the fluid mixture and the magnetic particles from the feed box into the hydrocyclone chamber; and an electric coil surrounding the primary hydrocyclone chamber, wherein the electric coil is configured to create a magnetic field so as to suspend the magnetic particles in the primary hydrocyclone chamber.

* * * * *